C. F. CHAPMAN.
RECORDING INSTRUMENT.
APPLICATION FILED AUG. 29, 1916.

1,299,427.

Patented Apr. 8, 1919.
2 SHEETS—SHEET 1.

Witness
Daniel Webster Jr.

Inventor
Charles F. Chapman
By Francis L. Chambers
his Attorney

C. F. CHAPMAN.
RECORDING INSTRUMENT.
APPLICATION FILED AUG. 29, 1916.

1,299,427.

Patented Apr. 8, 1919.
2 SHEETS—SHEET 2.

Witness
Daniel Webster, Jr.

Inventor
Charles F. Chapman
By Francis T. Chambers
his Attorney

UNITED STATES PATENT OFFICE.

CHARLES F. CHAPMAN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

RECORDING INSTRUMENT.

1,299,427.  Specification of Letters Patent.  Patented Apr. 8, 1919.

Application filed August 29, 1916. Serial No. 117,393.

*To all whom it may concern:*

Be it known that I, CHARLES F. CHAPMAN, a citizen of the United States of America, and resident of the city and county of Philadelphia and State of Pennsylvania, have invented a certain new and useful Improvement in Recording Instruments, of which the following is a true and exact description, reference being had to the accompanying drawings, which form a part thereof.

My present invention relates to recording instruments, and particularly to recording instruments of the type in which the needle of a galvanometer or like movable element of a sensitive meter mechanism, which normally is freely movable across the path of a traveling record or chart surface, is intermittently engaged and deflected into contact with the record surface or sheet, or with an intermediate part or parts to thereby make a record on said surface or sheet.

A general object of my invention is to provide a recording instrument with improved means for making the record markings on the record sheet or chart. More specifically, a primary object of my invention is to provide simple and effective needle deflecting means in an instrument of the type referred to, characterized on the one hand by the fact that a clock or other continuously operating slow moving motor mechanism forms the actuating device for the needle deflecting means, and characterized on the other hand by the relatively short period of time during which the needle is operatively engaged by the needle deflecting means and consequently restrained from movement in response to changes in the value of the quantity measured by the meter of which the needle forms a part. The invention also has for its object the provision of an improved housing structure for instruments of this type.

The various features of novelty which characterize my invention are pointed out with particularity in the claims annexed to and forming a part of this specification. For a better understanding of the invention, however, and the advantages possessed, and specific objects obtained by it, reference should be had to the accompanying drawings and descriptive matter in which I have illustrated and described a preferred embodiment of my invention.

Figure 1:
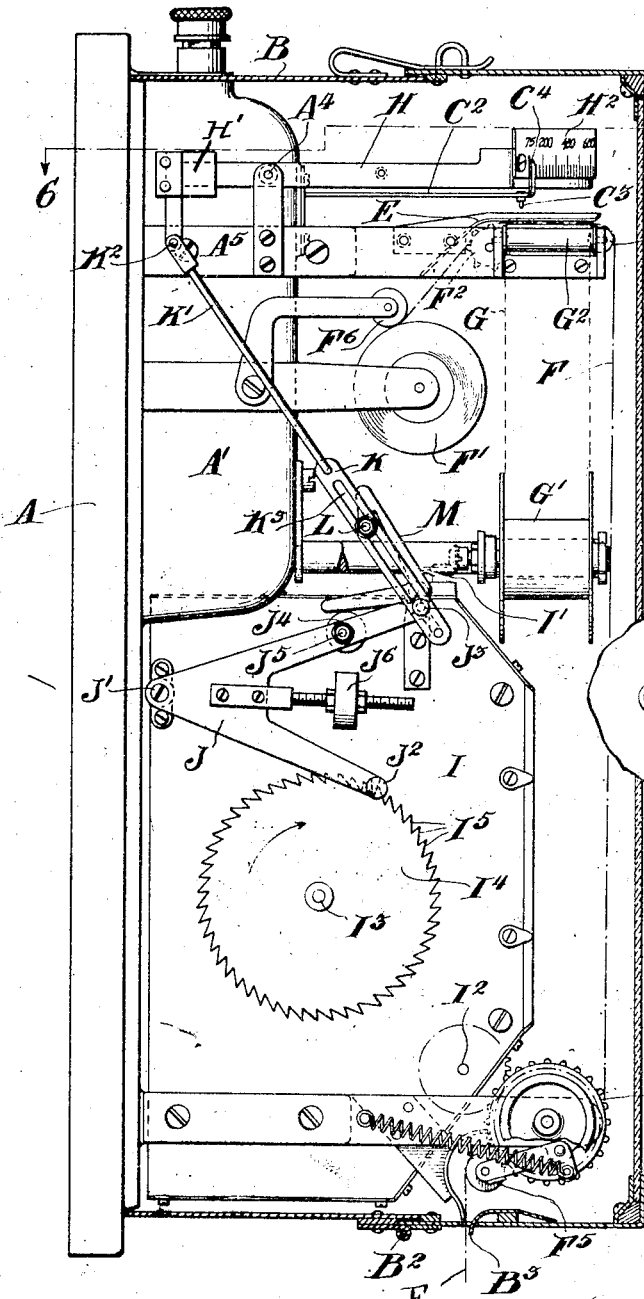
Figure 1 is a side elevation of an instrument embodying my present invention with the casing body and the door of the instrument casing shown in section.
Figure 2:
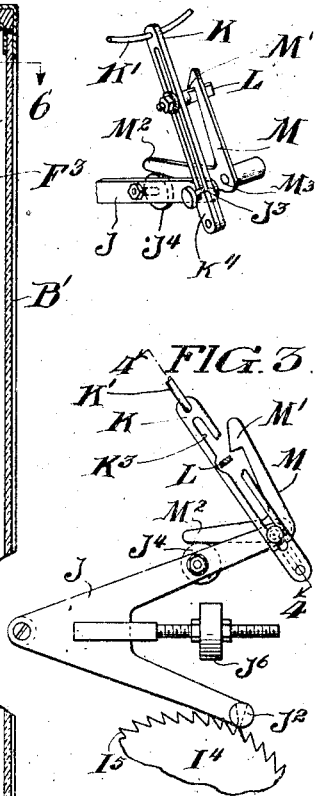
Fig. 2 is a perspective view of a portion of the mechanism shown in Fig. 1.

In the drawings A represents the base of the casing or housing of the instrument to which is secured, not only the body B of the instrument casing, but also the various movable instrumentalities of the instrument. The removable front B' of the casing is formed mainly of glass, and is hinge connected to the stationary or body portion at B². The instrument base A is formed as shown, with a hollow convex projection A' on its front side of the base. The interior of this hollow projection is open at the rear of the base and contains the measuring instrument, or other meter proper, which, as shown, is a galvanometer of the type employed as a sensitive volt meter and for like purposes. The instrument C is secured to the base member A by screws C', and is readily insertible in, and removable from its inclosing chamber through the opening into the latter at the rear of the base member. Preferably this opening is normally closed by a suitable cover plate $A^{10}$.

The movable exhibiting or indicating element of the instrument C is in the form of a flexible needle or arm $C^2$ which projects through a slot $A^2$ formed in the wall of the projection A'. The free end of the needle $C^2$ sweeps over a platen D forming a part of the recording mechanism. A record sheet F and a suitable transfer medium, as a strip of carbon paper, G, is fed across the platen D between the latter and a cover plate E. The latter is formed with an arc shaped slot E′ along which sweeps the transverse marking projection C³ secured to the free end of the needle C² as the latter oscillates about its pivotal axis. As shown, the record sheet F is drawn from a supply roll F′ over guide rolls F² and F³, at opposite sides of the platen D, onto a feed roll F⁴ against which the paper is held by a spring actuated friction roll F⁵. Advantageously as shown, the feed roll F⁴ may be provided with teeth entering previously formed notches or holes in the paper to insure a definite relation between the rotative movement of the measuring roll F′ and the travel of the paper strip F. F⁶ represents a gravity actuated tension roll bearing against the periphery of the supply roll F′. The carbon strip G, which is moved across the platen D in a direction at right angles to the direction of feed of the strip F, the latter being between the carbon strip G and platen D. The strip G is drawn from one of two rolls G′ on to the other over guide rolls G² at the opposite ends of the platen D.

The needle C² is intermittently engaged, and the mark forming portion C³ thereof forced through the slot E′ into contact with the carbon strip G by a deflector in the form of a pivoted boom or yoke member H. The member H, as shown, comprises an arc shaped body portion lying above the slot E′ in the cover plate E and integrally connected at its ends to legs which extend back parallel to one another and are pivotally connected at A⁴ to brackets carried by the standards A⁵ by which the platen D is connected to the base member A. Secured to the front side of the body portion of the member H is a graduated scale H² over which the index portion C⁴ of the needle C travels.

A spring motor or clock mechanism I, which may be of any suitable type commonly employed in recording instruments, is secured to the base A and forms a means for imparting continuous movement to the record sheet F and to the transfer paper G, and for intermittently oscillating the member H on its pivotal support. As shown, the clock mechanism I comprises a shaft I′ geared to one of the rolls G′, and comprises also a shaft I² geared to the feed roll F⁴. The clock mechanism also comprises a shaft I³ which has secured to it a toothed wheel I⁴ which forms a part of the means for giving the member H its intermittent oscillatory movement.

Figure 7:
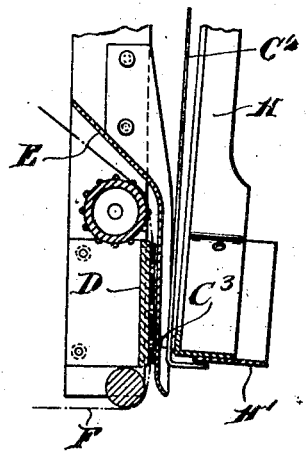
Fig. 7 is a partial section taken on the line 7—7 of Fig. 6 but on a larger scale and with the parts in different relative positions from those shown in Fig. 6.
Figure 6:
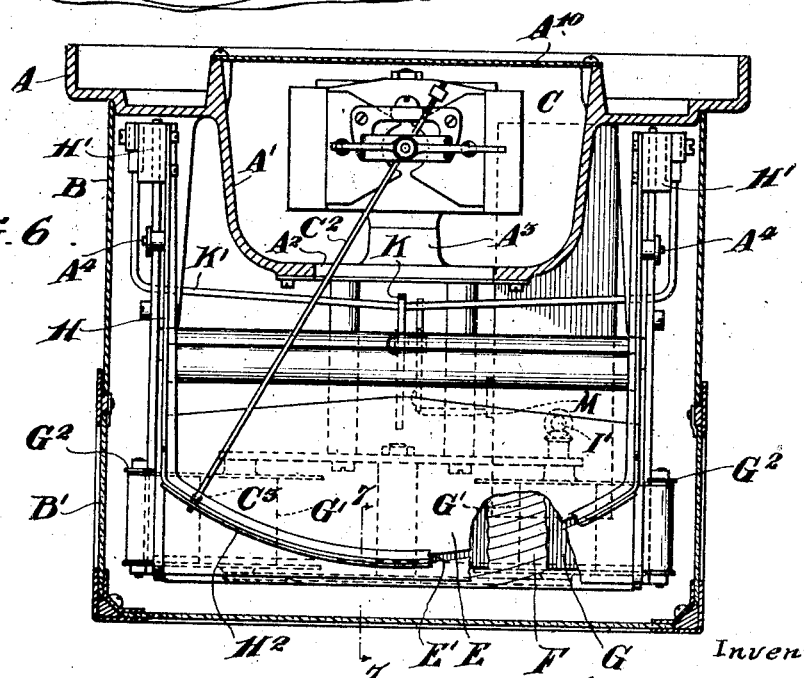
Fig. 6 is a plan view of the instrument shown in Fig. 1, with the casing of the instrument in section on the line 6—6 of Fig. 1.

The mechanism through which the member H is given its movement from the continuously rotating toothed wheel I⁴ comprises a member J which is pivotally supported at J′ and carries a tooth J² which rides up on the toothed periphery of the wheel I⁴. The teeth I⁵ at the periphery of the wheel I⁴ are so shaped that the free end of the member J rises slowly as the tooth J² rides up the inclined front side of each tooth I⁵, and then falls suddenly back as the tooth J² moving over the extreme tip of each tooth I⁵ drops down along the radial rear side of said tooth I⁵ into engagement with the bottom of the notch between that tooth and the following tooth. As the member J thus drops back it operates to return the deflector member H from the position in which it forces the needle part C³ into engagement with the transfer sheet G, as shown in Fig. 7, into the position in which the member H clears the needle, and the latter moves free of the coöperating recording devices as shown in Fig. 1. This is accomplished by means of a connecting rod extending between the member J and the member H. As shown, this connecting rod comprises a slotted arm K and a bow or yoke portion K′ to which one end of the arm K is connected. The ends of the bow portion K′ are pivotally connected at K² to the ends of the legs of the member H. The member J is provided with a pin or stud J³ which passes through the slot K³ and engages the end of the lower end wall of the slot K³, or rather as shown, the adjustable part K⁴ secured to the arm K and thereby moves the boom H into the position shown in Fig. 1 when the member J moves into the position shown in that figure. As shown, the adjustable part K⁴ is clamped to the member K by a clamping screw passing through the slot K³.

A lock M is provided for releasably securing the member H in the position shown in Fig. 1. In the construction shown in the drawings this lock is in the form of a latch pivotally connected to the frame of the clock mechanism at M³, and having a hook M′ adapted to normally take over a tooth or projection L secured to the member K and advantageously as shown, adjustably secured in the slot K³. The lock M also comprises an arm M² which extends into position to be engaged by a part J⁴ carried by the member J as the tooth J² of the latter rides up the outer side of each tooth I⁵ of the clock driven wheel I⁴. The part J⁴ should preferably be made adjustable, and as shown, this result is secured by making the member J⁴ in the form of a disk releasably clamped to the member J by a clamping stud J⁵ passing eccentrically through the disk J⁴. The portion of the member H in front of the pivotal supports A⁴ is partially but not entirely counterbalanced by the weights H′ adjustably secured to the free ends of the legs of the member H. The member J carries an adjustable weight J⁶ shown as a nut screwed on a threaded bolt like portion of the member J.

Figure 3:
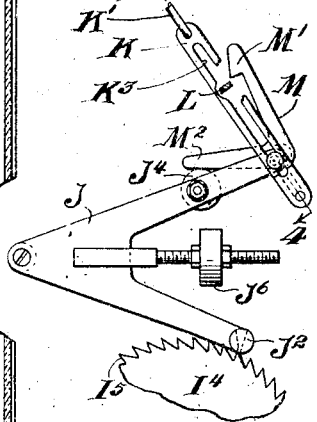
Fig. 3 is a view taken similarly to Fig. 1 of a portion of the apparatus shown in the latter figure with the parts in different relative positions.
Figure 4:
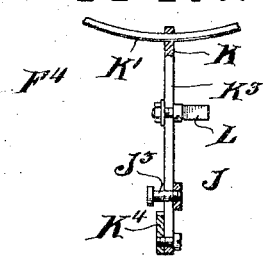
Fig. 4 is a section taken on the line 4—4 of Fig. 3.
Figure 5:
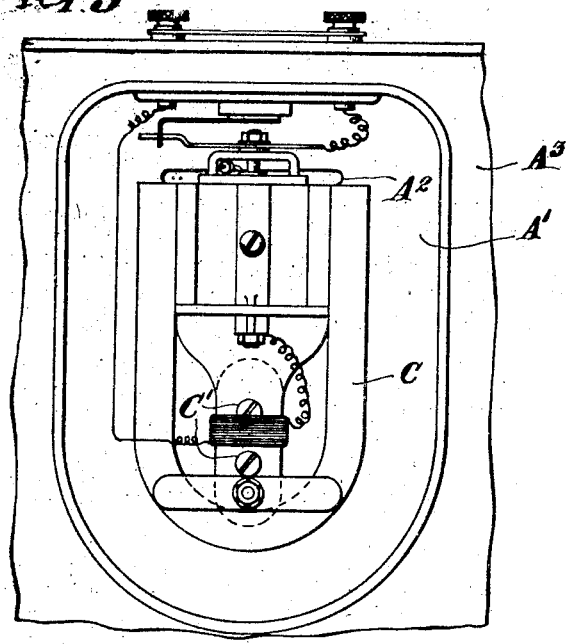
Fig. 5 is a rear elevation of a portion of the instrument shown in Fig. 1.

In operation the record sheet F and the transfer medium G are fed continuously but slowly across the platen D, while the hook M' of the lock M engages the projection L secured to the rod K the deflector H is thereby held in its elevated position. The needle $C^2$, during the portion of the time in which the latch member M hooks over the projection L of the connecting rod K, may swing freely across the platen D in response to variations in the quantity measured by the instrument C of which the needle C forms a part. As each tooth $I^5$ of the wheel $I^4$ passes under the tooth $J^2$ of the member J, the latter is slowly oscillated from the position shown in Fig. 1 into and through the position shown in Fig. 3. As the tooth $J^2$ rides up the front of each tooth $I^5$, and the member J is correspondingly raised, the pin $J^3$ moves in the slot $K^3$ away from the stop $K^4$ of the member K. The initial upward movement of the member J is without any direct effect upon the member K. As the member J approaches the upward limit of its movement, however, the projection $J^4$ engages the arm $M^2$ of the latch member M and moves the latter into the position shown in Fig. 3 thus releasing the member K and consequently the member H from the restraining effect of the member M. When this occurs, the forward end of the member H moves quickly downward under its own weight and thereby forces the marking portion $C^3$ of the flexible needle $C^2$ into engagement with the transfer sheet G. The needle $C^2$ is held stationary in this position during the slight time interval, following the release of the projection L by the hook M', necessary to carry the tooth $J^2$ past the extreme tip of the tooth $I^5$ on which it has been riding. When the tooth $J^2$ clears the tip of the tooth $I^5$ it falls immediately to the bottom of the notch beneath the tooth $I^5$ over which it has just passed, and the following tooth $I^5$. As the member J thus swings downward, the pin $J^3$ engages the stop $K^4$ and resets the self acting needle deflecting mechanism by raising the deflector and lowering the projection L into the position in which it is engaged by the hook M' of the lock M. It will be understood, of course, that the unbalanced weight of the member J must be great enough to raise the deflector H and thus reset the deflecting mechanism.

With such provisions for adjustment as are described it is a comparatively simple matter to make the time interval during which the needle $C^2$ is clamped between the member H and the platen D a very small fraction of the time interval required for the wheel $I^4$ to advance one tooth. This is an important practical feature as it avoids unnecessary strains on the measuring instrument and on the mechanism for advancing the record and carbon paper strips F and G, and reduces the liability to blurred and torn records. With the means described for mounting and inclosing the operating instrumentalities of the instrument it is possible to insert and remove the measuring instrument C when necessary without disturbing the rest of the apparatus; and what is more important, the delicate measuring instrument is not liable to be displaced in, and is protected to a high degree against injurious contact during, the operations of adjusting the remaining portion of the apparatus and of replenishing the record and carbon paper strips and the like.

As has been pointed out, I preferably employ as the transfer medium interposed between the marking element and the record sheet, a strip of carbon paper G. The use of the carbon paper in place of the ordinary ink impregnated cloth ribbon heretofore employed in recording instruments of this general type possesses the important practical advantage that owing to the smoother surface and more uniform thickness of the paper, there is less liability of the marking projection $C^3$ hooking into the transfer medium. A still more important advantage had from the use of carbon paper in place of the ordinary inked ribbon in an instrument of this type arises from the fact that with the paper the marking projection $C^3$ does not make an objectionable collection of fuzz which is frequently produced when the ordinary inked ribbon is employed in an instrument of this type. The practical importance of the advantages arising from the use of carbon paper transfer medium, as well as other features of the invention claimed, is enhanced by the fact that the meter element of the instrument is frequently of a very sensitive and delicate type. For example, the meter element may be used as a volt or ammeter for measuring electrical quantities of the small magnitude involved in ordinary electrical pyrometric measurements.

While in accordance with the provisions of the statutes I have illustrated and described the best form of my invention now known to me, it will be apparent to those skilled in the art that changes may be made in the form of the apparatus disclosed without departing from the spirit of my invention, and that some features of my invention may sometimes be used to advantage without a corresponding use of other features.

Having now described my invention, what I claim as new and desire to secure by Letters Patent, is:

1. In a recording instrument the combination of the type comprising a movable needle element and means for deflecting it at intervals into contact with coöperating recording means, consisting of a loaded needle deflector tending to move into the needle deflecting position, a lock normally holding said deflector out of said position, a member mounted to have a to and fro movement and adapted to trip said lock on a movement in one direction and on a return movement to return said deflector to the position from which it moves when said lock is released, and means for giving said member its to and fro movements at intervals.

2. In a recording instrument the combination of a movable needle element and means for deflecting it at intervals into contact with coöperating recording means, consisting of a loaded needle deflector tending to move into the needle deflecting position, a lock normally holding said deflector out of said position, a member mounted to have a to and fro movement and adapted to trip said lock on a movement in one direction and on a return movement to return said deflector to the position from which it moves when said lock is released, and time controlling means for giving said member its to and fro movements at regular intervals.

3. In a recording instrument of the type described, the combination with the needle element of needle deflecting means including a lock normally holding said means inoperative, a member mounted to have a to and fro movement and adapted to trip said lock on a movement in one direction and on a return movement to return said deflector to the position from which it moves when said lock is released, and a continuously operating motor for giving said member its to and fro movements at regular intervals.

4. In a recording instrument of the type described the combination with the needle element of deflecting means therefor including a lock normally restraining said deflecting means from operation, a continuously rotating toothed wheel, and a member riding on the teeth thereof and thereby intermittently raised and permitted to drop back, and adapted to trip said lock as it approaches the limit of its upward movement, and adapted to reset said deflecting means during its subsequent drop.

5. In an instrument of the type described the combination with a pivoted needle element of a loaded deflector tending to move into the position in which it deflects the needle, a clock mechanism including a continuously rotating toothed wheel, a member oscillated by said wheel, a resetting connection between said member and deflector, and a lock normally holding said deflector in an inoperative position and intermittently tripped by said member.

6. In a recording instrument of the type described, the combination with a pivoted needle element of a loaded deflector tending to move into the position in which it engages and deflects said needle, a lock normally holding said deflector in an inoperative position, a timing mechanism including a continuously rotating toothed wheel, a member engaged and oscillated by the teeth of said wheel and adapted to trip said lock as it moves in one direction, and a connection between said member and deflector whereby the latter is reset by the member on the return movement of said member.

7. In a recording instrument of the type described, the combination with a pivoted needle element of a loaded deflector tending to move into the position in which it engages and deflects said needle, a lock normally holding said deflector in an inoperative position, a timing mechanism including a continuously rotating toothed wheel, a member engaged and oscillated by the teeth of said wheel and adapted to trip said lock as it moves in one direction, and a connection between said member and deflector whereby the latter is reset by the member on the return movement of said member, said connection including provisions for lost motion whereby the movement of said member in one direction does not directly affect said deflector.

8. In an instrument of the type described the combination with the needle element of a needle deflector loaded with a tendency to move into the deflecting position, a lock normally holding said deflector out of said position, a motor mechanism including a continuously rotating toothed wheel, a member having a portion riding on the teeth of said wheel, said teeth and portion being so shaped that said wheel gives said member successive slow movements in one direction each followed by a rapid return movement, and said member tripping said lock as each of said slow movements nears its completion, and a connection between said member and deflector whereby the latter is reset during each quick return movement of said member.

9. In a recording instrument of the type described, the combination with a needle element of a deflector therefor loaded with a tendency to move said element into a recording position, an actuator, means for giving the latter a reciprocating movement, a lost motion connection between said actuator and deflector whereby the movement of the actuator in one direction tends to move the deflector into an inoperative position while a movement of the actuator in the opposite direction imparts no movement to the deflector, and a lock tending to maintain the deflector in its inoperative position and actuated by said actuator to release said deflector as said actuator approaches the limit of its movement in said opposite direction.

10. In a recording instrument comprising a meter having a movable exhibiting element and coöperating recording parts, the combination therewith of an instrument case or housing comprising a base member on the front side of which said coöperating parts are secured and formed with a hollow projection on its front side in which said meter is secured and being open at the rear side of the base to permit the insertion and removal of said instrument and being slotted to permit said movable exhibiting element to pass into engagement with said coöperating recording parts.

11. In an instrument of the type described the combination with a pivoted needle element of a weighted deflector extending over the needle and tending to move into the position in which it deflects the latter, a clock mechanism including a continuously rotating toothed wheel, a weighted member riding on the teeth of said wheel, a resetting connection between said member and deflector, and a latch normally holding said deflector in an inoperative position and intermittently tripped by said member.

12. In a recording instrument of the type described, the combination with the needle element, of a loaded deflector tending to move said element into a recording position, a lock normally holding said deflector in an inoperative position, a clock mechanism including a toothed wheel, a weighted member riding on the teeth of said wheel and thereby given successively rising and falling movements and adapted to trip said lock as it nears the end of each rising movement, a member connected to said deflector, and a lost motion connection between said members operative to reset the deflector during each falling movement of the weighted member without preventing the operation of the deflector when said lock is tripped.

13. In a recording instrument of the type described, the combination with the needle element, of a loaded deflector tending to move said element into a recording position, a clock mechanism including a toothed wheel, a weighted member riding on the teeth of said wheel and thereby given successively rising and falling movements and adapted to trip said lock as it nears the end of each rising movement, a member connected to said deflector, a lock normally engaging said member and thereby holding said deflector in an inoperative position but adapted to be tripped by said weighted member as the latter nears the end of each rising movement, and a lost motion connection between said members operative to reset the deflector during each falling movement of the weighted member without preventing the operation of the deflector when said lock is tripped.

CHARLES F. CHAPMAN.